United States Patent
Childs et al.

(10) Patent No.: US 7,350,908 B2
(45) Date of Patent: Apr. 1, 2008

(54) FLUID DISPENSER INCLUDING AN IMPROVED PRESSURE REGULATOR

(76) Inventors: Ashley E Childs, 1000 NE. Circle Blvd., Corvallis, OR (US) 97330; Karen St Martin, 1000 NE. Circle Blvd., Corvallis, OR (US) 97330; Garry Liddell, 1000 NE. Circle Blvd., Corvallis, OR (US) 97330; Eric S. Dod, 1000 NE. Circle Blvd., Corvallis, OR (US) 97330

( * ) Notice: Subject to any disclaimer, the term of this patent is extended or adjusted under 35 U.S.C. 154(b) by 320 days.

(21) Appl. No.: 11/064,750

(22) Filed: Feb. 24, 2005

(65) Prior Publication Data

US 2006/0187281 A1 Aug. 24, 2006

(51) Int. Cl.
  *B41J 2/175* (2006.01)
(52) U.S. Cl. .......................... 347/86; 347/87
(58) Field of Classification Search ............. 347/85, 347/86, 87, 92; 220/203.01, 203.21, 240
  See application file for complete search history.

(56) References Cited

U.S. PATENT DOCUMENTS

| 5,363,130 | A | * | 11/1994 | Cowger et al. ............... 347/92 |
| 5,526,030 | A | | 6/1996 | Baldwin et al. |
| 5,537,134 | A | | 7/1996 | Baldwin et al. |
| 5,933,175 | A | | 8/1999 | Stathem et al. |
| 5,988,803 | A | * | 11/1999 | Komplin et al. .............. 347/86 |
| 6,139,137 | A | | 10/2000 | Stathem et al. |
| 6,213,598 | B1 | | 4/2001 | Hou et al. |
| 6,494,568 | B2 | * | 12/2002 | Hou et al. .................... 347/86 |
| 6,523,945 | B2 | | 2/2003 | Powers et al. |
| 6,692,119 | B2 | | 2/2004 | Yu et al. |
| 6,789,885 | B1 | | 9/2004 | Michele et al. |
| 2002/0067397 | A1 | | 6/2002 | Powers et al. |
| 2004/0012661 | A1 | | 1/2004 | Lin et al. |
| 2004/0119798 | A1 | | 6/2004 | Nakamura et al. |

OTHER PUBLICATIONS

International Search Report for Application No. PCT/US2006/006119. Report issued Nov. 15, 2006.
International Search Report for Application No. PCT/US2006/006119. Report issued Jul. 17, 2006.

* cited by examiner

Primary Examiner—Anh T. N. Vo

(57) ABSTRACT

One embodiment of a fluid cartridge includes a fluid chamber including an interior for holding fluid and an exterior in communication with an ambient air pressure, and a pressure regulator aperture extending between the interior and the exterior of the fluid chamber, the pressure regulator aperture including a plurality of curved facets concave with respect to an elongate axis of the aperture.

15 Claims, 2 Drawing Sheets

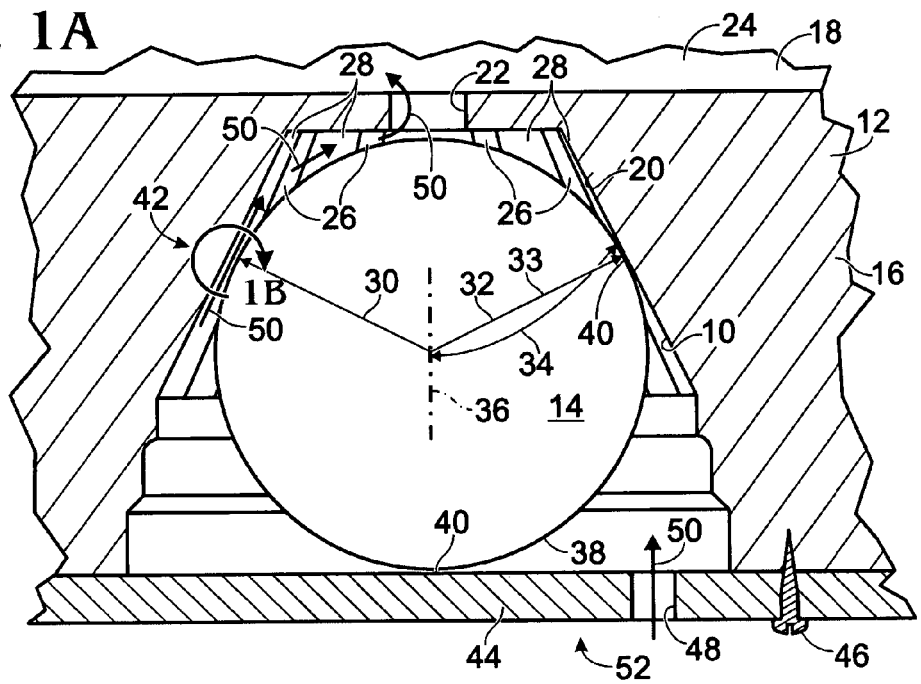
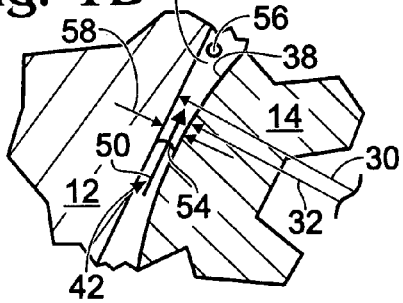
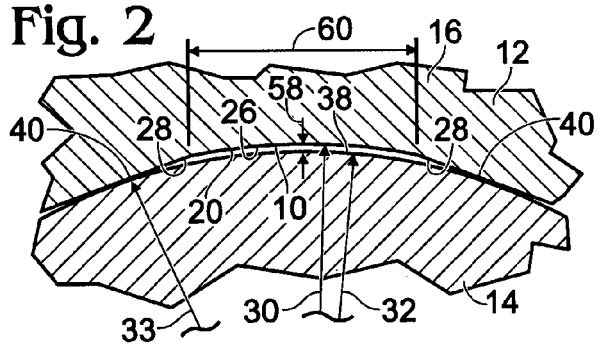
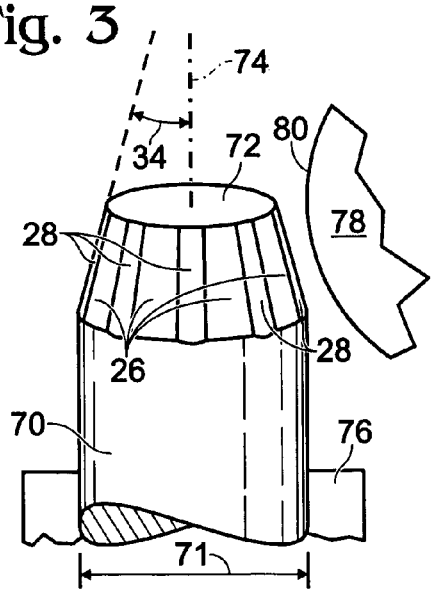

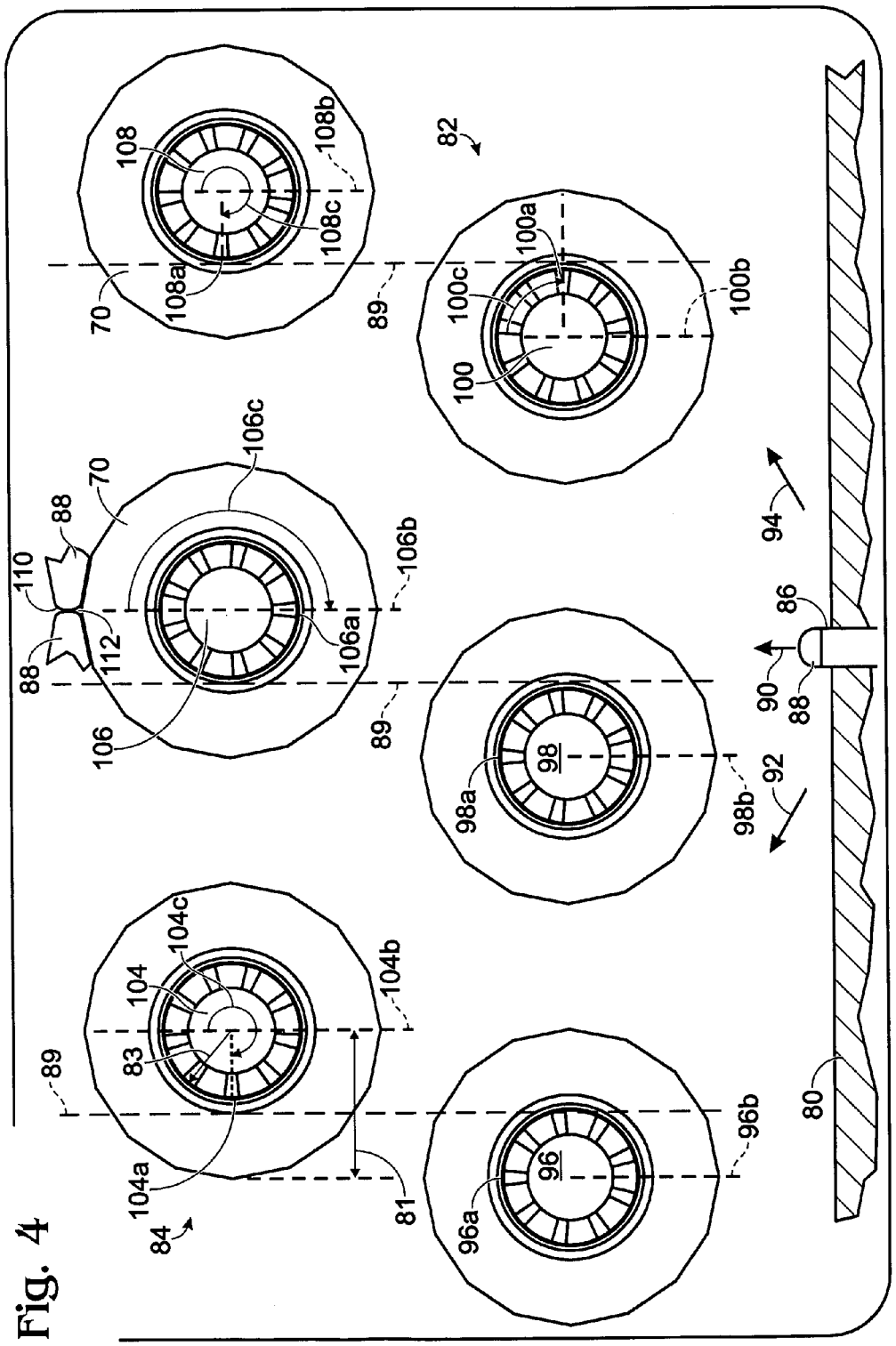

FLUID DISPENSER INCLUDING AN IMPROVED PRESSURE REGULATOR

BACKGROUND

Fluid dispensers, such as imaging devices, namely, printers, may utilize fluid from a fluid cartridge during use. As the fluid is depleted, it may be desirable to maintain an air pressure within the fluid cartridge by allowing air to bubble into the fluid cartridge to replace the volume of fluid withdrawn from the cartridge during use. Pressure regulators, such as bubble generators, may be utilized for this purpose.

Bubble generators may include a small orifice in a lower region of the fluid cartridge that may allow air to pass therethrough when an air pressure in the cartridge is less than an ambient air pressure outside the cartridge. The orifice may be manufactured in a small size so that a meniscus of fluid may hinder a flow of fluid outwardly from the cartridge.

Due to the small size of the bubble generator orifice it may be difficult to manufacture an orifice that can provide a consistent pressure between different fluid chambers of a single fluid cartridge or between like fluid devices. Accordingly, it may be desirable to provide a method of manufacturing a bubble generator orifice that results in a repeatable process for manufacturing an orifice having the desired specifications.

BRIEF DESCRIPTION OF THE DRAWINGS

FIGS. 1A and 1B are schematic side cross-sectional views of one embodiment of a pressure regulator opening in a fluid cartridge having a ball positioned therein.

FIG. 2 is a schematic top view of one embodiment of a pressure regulator passageway between a surface of the pressure regulator opening and the ball of FIG. 1.

FIG. 3 is a schematic side isometric view of one embodiment of a pin used to manufacture the pressure regulator opening of FIG. 1.

FIG. 4 is a schematic top view of one embodiment of an array of pins used to manufacture one embodiment of a fluid cartridge including six pressure regulator openings therein.

FIG. 5 is a schematic side cross-sectional view of one embodiment of a sealed chamber for surface treating one embodiment of a pressure regulator opening of a fluid cartridge.

DETAILED DESCRIPTION OF THE DRAWINGS

FIG. 1A is a schematic side cross-sectional view of one embodiment of a pressure regulator opening 10 in a fluid cartridge 12 having a ball 14 positioned therein. In the embodiment shown, the fluid cartridge is an ink cartridge utilized in a printer. However, in other embodiments, the fluid cartridge may be utilized in other applications, such as in a medical device. Print cartridge 12 may be manufactured of plastic and ball 14 may be glass. Print cartridge 12 may be a component of a printer 16 (only a portion of which is shown) that may print ink 18 on a print media (not shown) such as a sheet of paper. Opening 10 may comprise a first opening section that defines a tapered region 20 and a second opening section that may define a cylindrical region 22 that may extend from said tapered region 20 to an interior 24 of said print cartridge 12. Interior 24 may define an ink chamber for holding ink 18 wherein print cartridge 12 may include a plurality of ink chambers 24 each including their own pressure regulator opening 10. Each of interiors 24 may be sealed from one another such that the individual interiors 24 may each include a different ink, such as each including a different color or type of ink 18.

Tapered region 20 of print cartridge 12 may include a plurality of surfaces, such as one or more curved surfaces 26 and one or more flat surfaces 28. The curved and flat surfaces 26 and 28 may alternate with one another around tapered region 20. In the embodiment shown in FIG. 1A, four curved surfaces 26 and four flat surfaces 28 are shown in the cross-sectional view. Accordingly, in this embodiment, tapered region 20 includes a total of eight curved surfaces 26 and eight flat surfaces 28 extending in an alternating manner around tapered region 20. In another embodiment, tapered region 20 may include nine curved surfaces 26 and nine flat surfaces 28 which alternate around tapered region 20. In other embodiments, other numbers of curved and flat surfaces, or surfaces having different shapes, may be utilized.

Curved surfaces 26 may define a first radius 30 (see FIG. 2) and ball 14 may define a second radius 32 (see FIG. 2) wherein first radius 30 of curved surface 26 may be larger in size than second radius 32 of ball 14. Curved surfaces 26 may be positioned outwardly from the exterior of ball 14 with respect to the center of ball 14 such that radius 30 and radius 32 both extend from a center of ball 14. Surfaces 26 and 28 of tapered region 20 may be angled at an angle 34 with respect to an elongate axis 36 of opening 10 in a range of one to eighty nine degrees, and more particularly at an angle 34 in a range of one to forty five degrees with respect to elongate axis 36. Accordingly, when ball 14 is positioned within tapered region 20 of opening 10, an exterior surface 38 of ball 14 may contact only selected regions of tapered region 20, such as a tangent point 40 (only one tangent point 40 of tapered region 20 is shown in this view for ease of illustration) of three or more of flat surfaces 28. In particular, when ball 14 is received within tapered region 20, ball 14 may not contact curved surfaces 26 (see FIG. 2), or may only contact curved surfaces 26 along their edge where they meet flat surfaces 28. In one embodiment, ball 14 may seat upon three of the smallest radius flat facets 28 in tapered region 20. In other words, ball 14 may seat against the smallest inscribed diameter circle of tapered region 20. Such contact may define an air passageway 42 (see FIG. 1B) that extends between ball 14 and curved surfaces 26.

Ball 14 may be secured within tapered region 20 by a plate 44 and a fastener 46, wherein plate 44 may include an aperture 48. Accordingly, opening 10 may define an air pressure communication path 50 between interior 24 of print cartridge 12, through cylindrical opening region 22, through tapered opening region 20 at air passageway 42 and through aperture 48 in plate 44, to an exterior 52 of print cartridge 12. Air passageway 42 may define the smallest cross-sectional region of air pressure communication path 50 such that a meniscus 54 (see FIG. 1B) of ink 18 may form within air passageway 42. As ink 18 is depleted from interior 24 of print cartridge 12, the air pressure within interior 24 may be decreased below a pressure of ambient air at exterior 52 which may facilitate an air bubble penetrating the meniscus of ink (see FIG. 1B).

Referring to FIG. 1B, as ink 18 is depleted from interior 24, such as by printing of the ink through a printing aperture (not shown) of print cartridge 12, a meniscus 54 of ink 18 may temporarily deform or otherwise allow one or more bubbles 56 of air (or any gas) therethrough so as to return a pressure within interior 24 to a nominal level. Hence, pressure regulator opening 10 may be defined as a bubble opening or a bubble pressure regulator. After a pressure within interior 24 returns to its nominal level, by the introduction of air bubbles 56 to interior 24, meniscus 54 may return to its nominal non-air-penetratable shape. Air passageway 42 may define a width 58 sized to position meniscus 54 therein such that back pressure is maintained within print cartridge 12. Maintenance of the back pressure within the print cartridge may minimize ink from drooling out of the cartridge at other apertures (not shown) of the cartridge. In one embodiment, width 58 of air passageway 42 may be approximately 10 to 20 micrometers. The curved shape of curved surface 26, which is concave with respect to ball 14, allows for a very small air passageway 42 gap 58 such that air pressure within interior 24 of print cartridge 12 may be precisely controlled by meniscus 54.

FIG. 2 is a schematic top view of one embodiment of air passageway 42 positioned between one of curved surfaces 26 of opening 10 and exterior 38 of ball 14. Width 58 of air passageway 42 is shown extending between curved surface 26 of opening 10 and exterior surface 38 of ball 14, substantially parallel to radius 30 of curved surface 26 and radius 32 of ball 14. As a point along the flat surface moves away from the intersection of radius 30 of curved surface 26 and approaches tangency with Radius 32 of ball 14, width 58 may approach zero. It is the radial difference between the flat surfaces 28 and radius 30 of curved surfaces 26 that establishes the size of gap 58.

Manufacturing tapered region 20 to precise specifications, namely, a precise difference between radius 30 of curved surfaces 26 and a precise depth, or the inscribed radius 33, of flat surfaces 28 ground into the curved cone allows precise control of the size of air passageway 42. Air passageway 42 may also define a length 60 positioned substantially perpendicular to radii 30 and 32. In one embodiment, length 60 of air passageway 42 may be approximately 0.9 millimeter (mm) for an 8-facet version. As the number of facets is decreased, the length of air passageway 42 may increase.

FIG. 3 is a schematic side isometric view of one embodiment of a pin 70 used to manufacture tapered region 20 of pressure regulator opening 10 of FIG. 1. Pin 70 may be manufactured of metal, such as heat treated tool steel which is cylindrically ground to a precision diameter that defines radius 30 (see FIG. 2). In one embodiment, pin 70 may have a diameter 71 of approximately 5.496 mm. In the embodiment shown, pin 70 is a cylindrical steel rod having an end 72 and an elongate axis 74. End 72 may be secured in place by utilizing precision fixtures 76 and ground by a grinding wheel 78 having an abrasive surface 80, such as a surface of aluminum oxide. Grinding wheel 78 may be utilized to grind both curved surfaces 26 and flat surfaces 28 without removing pin 70 from fixtures 76.

In one embodiment, grinding wheel 78 first grinds pin 70 to define a tapered cylinder, inclined at angle 34, around elongate axis 74 of end 72 of pin 70. The tapered cylindrical outer shape of end 72 of pin 70 defines radius 30 of curved surfaces 26 of pin 70, measured from curved facets 26 to the central, elongate axis 74 of pin 70, and perpendicular to the exterior curved surface 26 of pin 70. The length of radius 30, in the embodiment shown, may decrease toward end 72 of pin 70. Prior to the grinding of flat facets 28, the tapered cylindrical surface of end 72 of pin 70 may extend completely around pin 70 so that grinding wheel 78 may grind curved surfaces 26 in a single grinding operation.

After the tapered cylindrical shape of pin 70 is defined by grinding wheel 78, flat facets 28 are then ground into pin 70 by grinding wheel 78 without removing pin 70 from fixtures 76. The continuous grinding operation wherein pin 70 remains in fixtures 76 for the grinding of curved facets 26 and flat facets 28 allows precise grinding of these surfaces. Flat facets 28 are ground to define a distance 33 (see FIG. 1A) from the surface of the flat facet to the center of pin 70, wherein distance 33 is measured along a line positioned substantially perpendicular to the flat facets 28 and extending through central, elongate axis 74 of pin 70. Distance 33 of flat facets 28 from elongate axis 74 of pin 70 decreases in length toward end 72 of pin 70. When pin 70 is utilized to mold tapered region 20 of opening 10, radius 30 of curved facets 26 of pin 70 define radius 30 of curved facets 26 of tapered region 20 of opening 10. Similarly, when pin 70 is utilized to mold tapered region 20 of opening 10, distance 33 of flat facets 28 of pin 70 define distance 33 of flat facets 28 of tapered region 20 of opening 10. Because distance 33 of flat facets 28 of tapered region 20 is smaller in size than radius 30 of curved facets 26 of tapered region 20, when ball 14 is placed within tapered region 20 of opening 10, ball 14 will contact the flat facets 28 at a position where radius 32 of ball 14 is equal to distance 33 of flat facets 28. In other words, distance 33 of flat facets 28 from central axis 36 of tapered region 20 will vary along the tapered region, but ball 14 will contact the distance 33 of flat facets 28, instead of the slightly larger radius 30 of curved surfaces 26, and such contact will occur where radius 32 of ball 14 is equal to distance 33 of flat facets 28.

Accordingly, a curvature of curved surfaces 26 may be precisely controlled by grinding wheel 78. In one embodiment, grinding wheel 78 may be rotated at speeds of 3000 to 3700 revolutions per minutes (rpm), and more particularly, at speeds of approximately 3600 rpm. Pin 70 may be ground in a precision surface grinding machine, where the grinding wheel 78 is aligned to a mechanical rotational fixture to provide the precise shape for surfaces 26 and 28. In another embodiment, grinding wheel 78 may be controlled by computer numerical controlled (CNC) to precisely grind surfaces 26 and 28 at angle 34. Grinding each of curved surfaces 26 and flat surfaces 28 without moving pin 70 from precision fixtures 76 allows precise control of the surfaces such that a small gap 58 of air passageway 42 (see FIG. 2) may be defined.

FIG. 4 is a schematic top view of an array of six eighteen-facet pins 70 used to manufacture one embodiment of a print cartridge having six pressure regulator openings therein. The eighteen facets of each of pins 70 include nine curved facets 26 and nine flat facets 28. In this embodiment, six pins 70 may be arranged in a mold 80 in a first row 82 and in a second row 84 with respect to an inlet 86 for molten material to mold 80. Molten material 88 entering mold 80 may move through inlet 86 in a radial flow pattern. There may be ribs 89 (indicated in dash lines) under a top surface of mold 80 that run in direction 90 between bubbler holes 96/104, 98/106 and 100/108 which may become flow leaders, establishing a primary flow in direction 90. The molten material, therefore, may flow in directions 90 and/or 92 and/or 94 with respect to inlet 86, and around pins 70 to form opening 10 (see FIG. 1). Molten material 88 may comprise plastic, or any other moldable material, utilized to manufacture print cartridges 12 (see FIG. 1). First row 82 may include three pins 96, 98 and 100. Pin 96 may include a flat facet 96a that may be centered at zero degrees with respect to primary flow direction 90, as measured from a backside of pin 96 with respect to a line 96b through pin 96 that is parallel to primary flow direction 90. Pin 98 may include a flat facet 98a that may be centered at zero degrees with respect to primary flow direction 90, as measured from a backside of pin 98 with respect to a line 98b through pin 98 that is parallel to primary flow direction 90. Pin 100 may include a flat facet 100a that may be centered at an angle 100c that is ninety degrees with respect to primary flow direction 90, as measured from a backside of pin 100 with respect to a line 100b through pin 100 that is parallel to primary flow direction 90.

Second row 84 of pins 70 may be offset from first row 82 by a distance 81 that is approximately the same as a radius 83 of pins 70. However, the arrangement of the rows of the pins shown, or any other arrangement of the pins, may be dictated by the desired position of the pressure regulator openings within print cartridge 12. Accordingly, any arrangement may be utilized. In this embodiment, second row 84 may include three pins 104, 106 and 108. Pin 104 may include a flat facet 104a that may be centered at an angle 104c that is 270 degrees with respect to primary flow direction 90, as measured from a backside of pin 104 with respect to a line 104b through pin 104 that is parallel to primary flow direction 90. Pin 106 may include a flat facet 106a that may be centered at 180 degrees with respect to primary flow direction 90, as measured from a backside of pin 106 with respect to a line 106b through pin 106 that is parallel to primary flow direction 90. Pin 108 may include a flat facet 108a that may be centered at an angle 108c that is 270 degrees with respect to primary flow direction 90, as measured from a backside of pin 108 with respect to a line 108b through pin 108 that is parallel to primary flow direction 90.

During molding of print cartridge 12 (see FIG. 1) molten material 88 may flow through inlet 86 and into mold 80. Molten material 88 may flow around pins 70 and form a "knit line" 110 where the two frontal regions of flow meet one another (shown schematically at pin 106 in this figure) on the backside of individual pins 70. The knit line 110 may result in a gap 112 (shown enlarged for ease of illustration) between molten material 88 and pin 70. To provide consistent pressure regulation by openings 10 in a print cartridge, it may be desirable to provide a consistent and repeatable size of such gaps 112 at knit lines 110. Due to the small size of opening 10, tolerances in the size of gap 112 may be a large percentage of the total opening width. Accordingly, reducing such tolerances may be desirable to reduce a variation in pressure between like manufactured openings 10.

Placement of the curved and flat surfaces 26 and 28 of pins 70 in predeteremined orientations, as listed in the above paragraph for one particular embodiment of six pins 70, may provide a consistent knitting of the frontal regions of flow of molten material 88 such that the size of gap 112 may be consistently sized in different print cartridges manufactured from mold 80. Applicants have found that this particular orientation of pins 70, listed above, for the particular spacing and arrangement of pressure regulator openings 10 in print cartridge 12 (see FIG. 1) provides a repeatable gap size 112. In the embodiment shown, gap size 112 may be approximately 10-20 micrometers. In other embodiments, pins 70 may be arranged with a flat or a curved facet in a different orientation with respect to initial flow direction 90, so as to a yield repeatable gap size 112.

FIG. 5 is a schematic side cross-sectional view of a sealed chamber 114 for surface treating the pressure regulator openings 10 of a print cartridge 12. Print cartridge 12 is shown lying on its side such that six pressure regulator openings 10 (shown large in size for ease of illustration) in a lower surface 116 of print cartridge 12 are in view. Of course, any orientation of print cartridge 12 in chamber 114 may be utilized, such as lower surface 116 of print cartridge 12 facing upwardly, which may provide the most even surface treatment of openings 10. Print cartridge 12 may be placed on a support 118 and may be surface treated with a surface treatment material 120 that may flow into sealed chamber 114 though an inlet 122. The surface treatment may comprise an oxygen plasma ashing treatment, a corona discharge treatment and/or a fluorination treatment in the presence of oxygen. The corona discharge treatment may not utilize a sealed chamber. Instead, the corona discharge treatment may utilize a conveyor chamber 114 including a conveyor belt 118 and a nozzle spray 122 that may spray oxygen plasma onto a part as it runs underneath on conveyor belt 118 such that the swath of material that passes underneath the nozzle spray may receive the surface treatment.

The oxygen plasma ashing treatment may include placing print cartridge 12 onto support 118 in chamber 114 by a robot, sealing and evacuation of chamber 118 and then flowing treatment material 120 into the chamber. The ashing treatment may be conducted for a time period in a range of 15 to 60 seconds, and may be approximately 30 seconds. The pressure may be in a range of 400 to 1,000 millitorr, and may be approximately 600 millitorr. The power may be in a range of 500 to 700 watts, and may be approximately 600 watts. The surface treatment material 120 may be oxygen. After the ashing process, chamber 118 may be vented and the print cartridge removed.

Due to the surface treatment of opening 10 of print cartridge 12, the surface around opening 10 may become more wettable, thereby changing the contact angle of fluid at opening 10. The pressure differential, or bubble pressure across meniscus 54 (see FIG. 1B) may vary by the cosine of the contact angle of a fluid on the wall of opening 10 and on ball 14. Very high contact angles of the fluid on the plastic of opening 10 can cause low bubble pressure which may be inadequate to enable proper function of the print cartridge. Accordingly, the surface treatment of the present invention may make the surface more wettable, may lower the contact angle of the fluid on the wall of opening 10, and thereby may allow an increased pressure differential across opening 10. An increased pressure differential across opening 10 may allow a desired pressure to be developed in interior 24 of the print cartridge.

The fluorination process variables may be similar to the variables of the oxygen ashing process. However, in the fluorination process the fluorine and oxygen mixture may be introduced to the device in a closed chamber at room temperature. In one embodiment, the fluorination process may use nitrogen for the inert gas at 760 torr or 1 Atmosphere, and the fluorine and oxygen may be at a pressure 1.2 torr above the pressure of the nitrogen. Fluorination may benefit the surface treatment process with permanence. The improved wettability effect of standard oxygen ash can diminish over time when the surface contacts air. The fluorination process may tend to cross link the surface so the surface chemical species are stable in the presence of air or other non-polar environments. The oxygen may react with the surface to provide the wettable chemical species while the fluorine may facilitate the reaction and cross linking.

The cornona discharge variables may include conveyor speed and the distance between the part and the tool head. The variables may be adjusted to suit a particular application. In one embodiment, the conveyor speed may be 1.5 feet/second and the distance between the part and nozzle 122 may be one inch.

Other variations and modifications of the concepts described herein may be utilized and fall within the scope of the claims below.

We claim:

1. A print cartridge, comprising:
   an ink chamber including an interior for holding ink and an exterior in communication with an ambient air pressure; and
   a pressure regulator aperture extending between said interior and said exterior of said ink chamber, said pressure regulator aperture including a plurality of curved facets concave with respect to an elongate axis of said aperture and a plurality of flat facets that are positioned alternatingly between said curved facets such that each flat facet directly abuts two adjacent curved facets.

2. The print cartridge according to claim 1 wherein said pressure regulator aperture defines a tapered recess, said print cartridge further including a ball positioned within said tapered recess.

3. The print cartridge according to claim 2 wherein said curved facets define a first radius and said ball defines a second radius different from said first radius.

4. The print cartridge according to claim 3 wherein said first radius is larger than said second radius.

5. The print cartridge according to claim 1 wherein said print cartridge defines a central axis, and wherein one of said flat facets is positioned in a predetermined position with respect to said central axis so as to reduce a variation in pressure at said pressure regulator opening between multiple manufactured print cartridges.

6. The print cartridge according to claim 1 including a pattern of a single curved facet, a single flat facet, another single curved facet, and another single flat facet, wherein said pattern is repeated around said aperture.

7. A print cartridge, comprising:
   means for holding ink therein; and
   means for regulating pressure within said means for holding ink, said means for regulating pressure comprising a plurality of curved facets concave with respect to an elongate axis of an aperture and a plurality of flat facets that alternate position with said curved facets, such that only a single flat facet is positioned between adjacent ones of said plurality of curved facets.

8. The print cartridge of claim 7 wherein said means for regulating pressure further comprises:
   a tapered cone defined by said curved facets and flat facets; and
   a ball positioned within and contacting only selected regions of said tapered cone.

9. A print cartridge, comprising:
   an ink chamber including an interior for holding ink and an exterior in communication with an ambient air pressure; and
   a pressure regulator aperture extending between said interior and said exterior of said ink chamber, said pressure regulator aperture including a plurality of curved surfaces and a plurality of flat surfaces wherein said curved and flat surfaces define a pattern of a single curved surface, a single flat surface, another single curved surface, and another single flat surface, wherein said pattern is repeated continuously around said pressure regulator aperture.

10. A print cartridge, comprising:
    an ink chamber including an interior for holding ink and an exterior in communication with an ambient air pressure; and
    a pressure regulator aperture extending between said interior and said exterior of said ink chamber, said pressure regulator aperture including a pattern of alternating single flat surfaces and single curved surfaces.

11. The print cartridge according to claim 10 wherein said pattern extends completely around said aperture and wherein each of said flat surfaces define a single first arc length and each of said curved surfaces define a single second arc length.

12. The print cartridge according to claim 11 wherein said single first arc length of each flat surface and said single second arc length of each curved surface is measured around a circumference of said aperture, wherein said circumference is positioned in a plane perpendicular to an elongate axis of said aperture.

13. A print cartridge, comprising:
    an ink chamber including an interior for holding ink and an exterior in communication with an ambient air pressure; and
    a pressure regulator aperture extending between said interior and said exterior of said ink chamber, said pressure regulator aperture including a pattern of alternating single flat surfaces and single curved surfaces; and
    a ball positioned within said pressure regulator aperture, wherein every one of said flat surfaces contacts said ball at a midpoint of said flat surface.

14. A print cartridge, comprising:
    means for holding ink therein; and
    means for regulating pressure within said means for holding ink, said means for regulating pressure comprising a plurality of curved surfaces and a plurality of flat surfaces that alternate position with said curved surfaces; and
    a ball positioned within a pressure regulator aperture of the means,
    wherein every one of said flat surfaces defines a plane that contacts said ball only at a tangent point on said plane.

15. A print cartridge, comprising:
    means for holding ink therein; and
    means for regulating pressure within said means for holding ink, said means for regulating pressure comprising a plurality of curved surfaces and a plurality of flat surfaces that alternate position with said curved surfaces; and
    a ball positioned within a pressure regulator aperture of the means,
    wherein every one of said plurality of curved surfaces together define a single tapered cylinder and wherein each of said plurality of flat surfaces intersects said single tapered cylinder along first and second edge lines.

* * * * *